# (12) United States Patent
Asher (10) Patent No.: US 8,649,509 B2
(45) Date of Patent: Feb. 11, 2014

(54) SYSTEMS AND COMPUTER PROGRAM PRODUCTS FOR GENERATING AND VERIFYING RANDOMIZED HASH VALUES

(75) Inventor: Michael L. Asher, Green Cove Springs, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 687 days.

(21) Appl. No.: 12/338,407

(22) Filed: Dec. 18, 2008

(65) Prior Publication Data

US 2010/0158242 A1 Jun. 24, 2010

(51) Int. Cl.
*H04K 1/00* (2006.01)
*H04L 9/32* (2006.01)

(52) U.S. Cl.
USPC ............ 380/28; 380/30; 463/29; 713/168; 713/170; 713/176; 713/180

(58) Field of Classification Search
USPC ................... 380/28, 30; 713/168–180
See application file for complete search history.

(56) References Cited

U.S. PATENT DOCUMENTS

| | | | | |
|---|---|---|---|---|
| 4,538,240 | A | * | 8/1985 | Carter et al. ............. 708/492 |
| 5,432,852 | A | * | 7/1995 | Leighton et al. ............ 380/30 |
| 5,867,578 | A | * | 2/1999 | Brickell et al. ............ 713/180 |
| 6,091,821 | A | * | 7/2000 | Buer ........................ 380/30 |
| 6,266,771 | B1 | * | 7/2001 | Bellare et al. ............. 713/176 |
| 2002/0046339 | A1 | * | 4/2002 | Bellare et al. ............. 713/170 |
| 2007/0067625 | A1 | * | 3/2007 | Jiang et al. ............... 713/168 |
| 2008/0059590 | A1 | * | 3/2008 | Sarafijanovic et al. ...... 709/206 |
| 2008/0076547 | A1 | * | 3/2008 | Bigelow et al. ............. 463/29 |

OTHER PUBLICATIONS

Bok-Min, Goi; Siddiqi, M; Chuah, H. T.; "Incremental Hash Function Based on Pair Chaining & Modular Arithmetic Combining", Lecture Notes in Computer Science, 2001, vol. 2247/2001, pp. 50-61, (hereinafter, Bok-Min).*
Kefah, Rabah; "Secure Implementation of Message Digest, Authentication and Digital Signature", Information Technology Journal 4(3): 204-221, 2005, ISSN 1812-5638.*

* cited by examiner

*Primary Examiner* — Carl Colin
*Assistant Examiner* — S. Ali Zaidi
(74) *Attorney, Agent, or Firm* — Myers Bigel Sibley & Sajovec, P.A.

(57) ABSTRACT

A system generates a randomized hash value and/or verifies data against a randomized hash value. A hashing circuit can respond to data by randomly selecting a hashing algorithm parameter among a defined set of different hashing algorithm parameters, and by applying a hashing algorithm that uses the selected hashing algorithm parameter to hash the received data to generate a randomized hash value. Another hashing circuit randomly selects a hashing algorithm among a defined set of different hashing algorithms, and applies the selected hashing algorithm to hash the received data to generate a randomized hash value. Another hashing circuit applies a hashing algorithm to hash received data to generate an intermediate hash value that occupies a defined memory space, and randomly selects a partial segment of the hash value from a segment of the defined memory space to generate a randomized hash value.

13 Claims, 6 Drawing Sheets

SYSTEMS AND COMPUTER PROGRAM PRODUCTS FOR GENERATING AND VERIFYING RANDOMIZED HASH VALUES

BACKGROUND

This disclosure relates generally to electronic protection of data and, more particularly, to systems and computer program products that generate and verify hash values.

Networked and other publicly accessible computer systems and data communications are vulnerable to attacks from hackers or other malicious systems. To defend against or prevent such attacks, a variety of network security techniques, such as cryptographic tools, have been developed.

Hash functions are commonly used to, for example, encrypt secret passwords that are used by users to login to a computer system and to generate digital signatures for user documents, messages, and other sensitive data. A hash function can be viewed as a one-way mathematical function that encrypts data, because, for practical purposes, the data that was input into the hash function cannot be calculated backwards from the resulting hash value.

The hash function may thus receive a plaintext password as an input and generate a unique hash value for that password as an output. A computer system may store only a copy of the password's hash value, so that the password's plaintext is known only to the user. In such an arrangement, when the user enters the plaintext password, the system will calculate a hash value for the entered password and compare the hash value to the stored hash value. If the two hash values match, the computer system will then accept the password and authenticate the user.

To increase the security of the password hash function, a salt value may be used. As known in the art, the salt value is an extra value that may be added to the password that is entered by the user. The salt value may, for example, be a bit string, such as a string of characters, integers or bits generated by a number generator. The hash function will thus compute a hash value based on a combined input of the plaintext password and the salt value. The salt value thereby increases the difficulty for an attacker to calculate backwards the user's plaintext password from the hash value. A salt value may thus be a counter-measure against attacks based on pre-calculated password hash values (so-called "rainbow table" attacks).

However, in view of the continuing rapid increases that are being achieved in the processing throughput and memory of emerging computer systems, the use of a hashing without or without salt values may not provide a sufficient level of security for user's plaintext passwords or other sensitive data.

SUMMARY

Various embodiments are directed to a system that includes a controller which generates a randomized hash value and/or verifies data, such as data received from a user, against a randomized hash value.

In some embodiments, the controller includes a hashing circuit that responds to data by randomly selecting a hashing algorithm parameter among a defined set of different hashing algorithm parameters, and by applying a hashing algorithm that uses the selected hashing algorithm parameter to hash the received data to generate a randomized hash value.

In some other embodiments, the controller includes a hashing verification circuit that responds to data that is to be verified against a randomized hash value by selecting among a defined set of different hashing algorithm parameters, applying a hashing algorithm that uses the selected hashing algorithm parameter to hash the data to generate a hash value, comparing the hash value to the randomized hash value, outputting a passed verification result in response to the hash value matching the randomized hash value, and repeating the selecting, applying, and comparing operations in response to the hash value not matching that the randomized hash value.

In some other embodiments, the controller includes a hashing circuit that responds to data by randomly selecting a hashing algorithm among a defined set of different hashing algorithms, and by applying the selected hashing algorithm to hash the received data to generate the randomized hash value.

In some other embodiments, the controller includes a hashing verification circuit that responds to data that is to be verified against a randomized hash value by selecting among a defined set of different hashing algorithms, applying the selected hashing algorithm to hash the data to generate a hash value, comparing the hash value to the randomized hash value, outputting a passed verification result in response to the hash value matching the randomized hash value, and repeating the selecting, applying, and comparing operations in response to the hash value not matching that the randomized hash value.

In some other embodiments, the controller includes a hashing circuit that responds to data by applying a hashing algorithm to hash the received data to generate an intermediate hash value that occupies a defined memory space, and by randomly selecting a partial segment of the hash value from a segment of the defined memory space to generate a randomized hash value.

In some other embodiments, the controller includes a hashing verification circuit that responds to data that is to be verified against the randomized hash value by applying a hashing algorithm to hash the data to generate a hash value that occupies a defined memory space, selecting a partial segment of the hash value from a segment of the defined memory space to generate a hash value, comparing the hash value to the randomized hash value, outputting a passed verification result in response to the hash value matching the randomized hash value, and repeating the selecting and comparing operations in response to the hash value not matching that the randomized hash value.

In some other embodiments, a computer program product generates randomized hash values in response to receiving data by carrying out at least one of:

1) randomly selecting a hashing algorithm parameter among a defined set of different hashing algorithm parameters, and by applying a hashing algorithm that uses the selected hashing algorithm parameter to hash the received data to output the randomized hash value;

2) randomly selecting a hashing algorithm among a defined set of different hashing algorithms, and applying the selected hashing algorithm to hash the received data to output the randomized hash value; and 3) applying a hashing algorithm to hash the received data to generate an intermediate hash value that occupies a defined memory space, and by randomly selecting a partial segment of the hash value from a segment of the defined memory space to output the randomized hash value.

In some other embodiments, a computer program product verifies hash values in response to receiving data by carrying out at least one of:

1) selecting among a defined set of different hashing algorithm parameters, applying a hashing algorithm that uses the selected hashing algorithm parameter to hash the data to generate a hash value, comparing the hash value to the randomized hash value, outputting a passed verification result in response to the hash value matching the randomized hash value, and repeating the selecting, applying, and comparing operations in response to the hash value not matching that the randomized hash value;

2) selecting among a defined set of different hashing algorithms, applying the selected hashing algorithm to hash the data to generate a hash value, comparing the hash value to the randomized hash value, outputting a passed verification result in response to the hash value matching the randomized hash value, and repeating the selecting, applying, and comparing operations in response to the hash value not matching that the randomized hash value; and 3) applying a hashing algorithm to hash the data to generate a hash value that occupies a defined memory space, selecting a partial segment of the hash value from a segment of the defined memory space to generate a hash value, comparing the hash value to the randomized hash value, outputting a passed verification result in response to the hash value matching the randomized hash value, and repeating the selecting and comparing operations in response to the hash value not matching that the randomized hash value.

Other systems, controller circuits, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION OF EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments may be embodied as methods, systems, devices and/or computer program products. Accordingly, exemplary embodiments may be embodied in hardware and/or in software (including firmware, resident software, micro-code, etc.). Furthermore, exemplary embodiments may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, or other apparatus or device configured to store computer readable program code. More specific examples (a nonexhaustive list) of the computer-readable medium would include the following: a portable computer diskette, a random access memory (RAM), a read-only memory (ROM), an erasable programmable read-only memory (EPROM or Flash memory), and an optical disc read-only memory.

The exemplary embodiments are described below with reference to block diagrams and/or operational illustrations of methods, systems, and computer program products. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

For purposes of illustration some embodiments are described herein in the context of hashing systems that generate a randomized hash value from user data, such from a user file, message, and/or password, and related verification systems that iteratively attempt to verify received user data against the randomized hash value. It will be understood, however, that the present invention is not limited to such embodiments and that the it may be embodied as any type of electronic device that is capable of hashing any type of data and/or verifying any type of data against one or more hash values. Moreover, although separate hashing systems and verification systems are described, is to be understood that both systems may reside in the same computer (e.g., desktop computer, network server, etc.).

Unlike most encryption processes, hashing is a "one-way" process in which the hashed user data may be extremely difficult to reconvert back into the original user data. The unidirectional nature of hashing makes it well adapted for use in security systems where attackers are assumed to be able to view the hashed user data, which can include hashed passwords, hashed documents, hashed messages, or other hashed sensitive data. A hashing algorithm of sufficient strength may be substantially immune to attacks other than by "brute force", where an attacker has sufficient computer processing throughput and memory resources to be able to attempt all possible values of the original user data. One measure of the strength of a hashing algorithm is the number of memory bits used by the hash value.

Some hashing algorithms have been shown to be relatively weak and subject to rainbow attacks where an attacker precomputes and stores all possible hash values for corresponding possibilities of user input data (e.g., for all ASCII characters) in a memory table, and then matches the hash value to one of the stored possible hash values to retrieve the corresponding user data. The size of the memory can be reduced by the attacker computing "chains", by repeatedly hashing the same user data and storing only the final hash value in the chain. It has been shown that the Message-Digest algorithm 5 (MD5) and other hashing algorithms may be subject to successful attacks using rainbow tables.

A "salt" value can be concatenated with the user data (e.g., plaintext) provided additional defense against attacks, such as rainbow attacks. However, such use of salt values requires that a verification system store the salt value along with each corresponding inputted data that has been hashed using the salt value.

Some embodiments may arise from the present realization that many attacks against hashing systems are based on the deterministic nature of hash functions. i.e. that a given input value always hashes to the same hashed value. In accordance with some embodiments, a hashing system introduces a degree of randomness into the hashing process that creates nondeterministic mapping from one input to a plurality of hash value outputs, in sharp contrast to the one-to-one deterministic mapping from input to hash output provided by conventional hashing processes. This nondeterministic hashing process may substantially increase the strength of the resulting hash value against some attacks, such as rainbow attacks.

Figure 1:
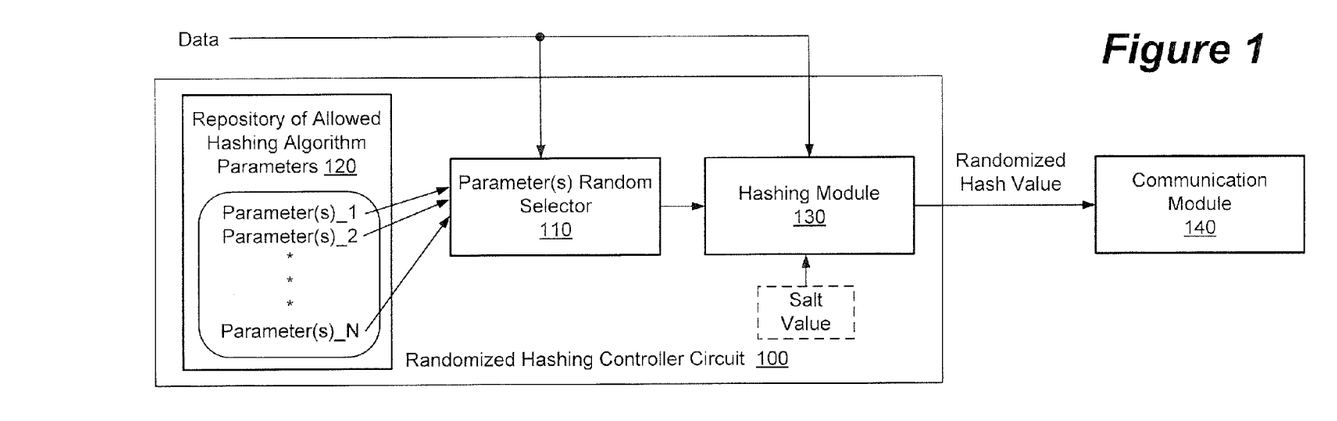
FIG. 1 is a block diagram that illustrates a randomized hashing controller that generates a randomized hash value in accordance with some embodiments.
Figure 2:
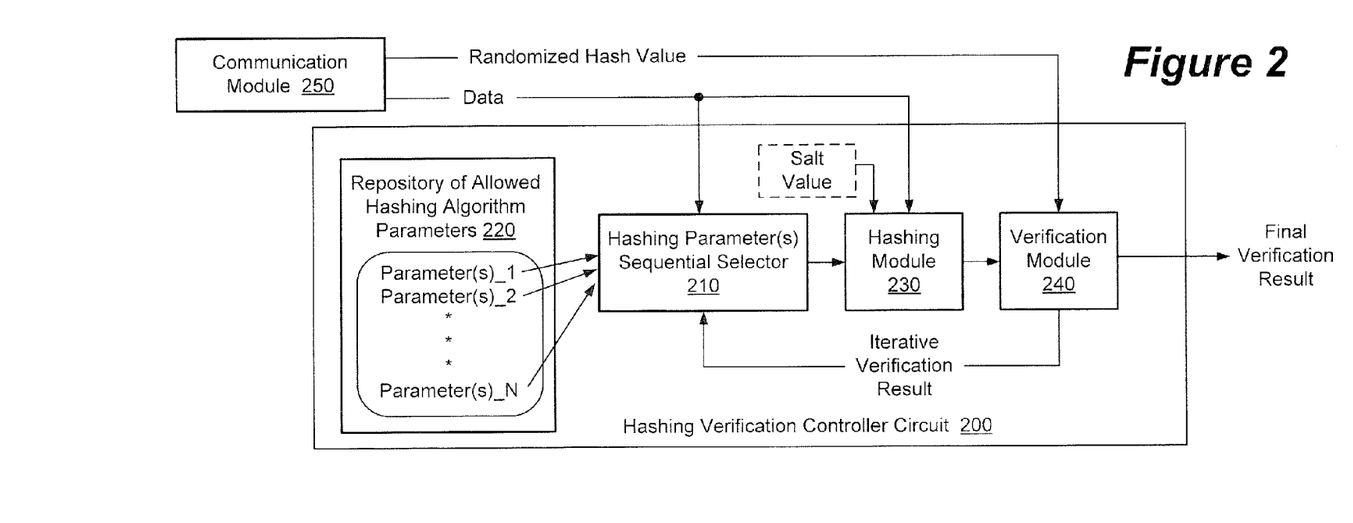
FIG. 2 is a block diagram that illustrates a verification controller that verifies data against a randomized hash value in accordance with some embodiments.

FIG. 1 is a block diagram that illustrates a randomized hashing controller circuit ("randomized hashing controller") 100 that generates a randomized hash value in accordance with some embodiments. FIG. 2 is a block diagram that illustrates operations 300 that may be carried out by the randomized hashing controller 100 to generate a randomized hash value in response to receiving data. The data may include, but is not limited to, passwords, user files/documents, messages, or other sensitive data.

Figure 3:
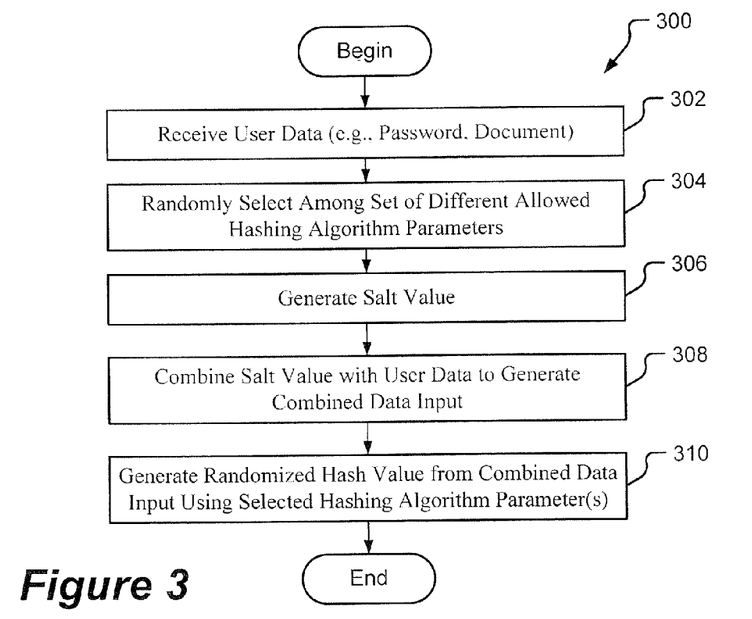
FIG. 3 is a flowchart that illustrates operations, which may be carried out by the randomized hashing controller of FIG. 1, to generate a randomized hash value in accordance with some embodiments.

Referring to FIGS. 1 and 3, the randomized hashing controller 100 may include a hashing algorithm parameter random selector 110, a repository 120, and a hashing module 130. The repository 120 (e.g., a computer readable memory) contains a set of different hashing algorithm parameters (e.g., parameter(s)_1, parameter(s)_1, . . . parameter(s)_N). The random selector 110 responds to the data (block 302) by randomly selecting (block 304) a hashing algorithm parameter(s) among the set of hashing algorithm parameters in the repository 120.

The hashing module 130 may generate or otherwise obtain an optional salt value (block 306) from a memory, and combine the salt value with the data to generate a combined data input (block 308). The hashing module 130 then applies a hashing algorithm that uses the selected hashing algorithm parameter to hash the combined data input to generate a randomized hash value (block 310).

The hashing module 130 may use the selected hashing algorithm parameter to define a bit shift distance that the hashing algorithm shifts bits of the data during computation of the randomized hash value. Alternatively or additionally, the hashing module 130 may uses the selected hashing algorithm parameter to define at least one constant that is added to intermediate values of the randomized hash value during computational iterations of the hashing algorithm. The algorithmic operations for shifting bits during hashing of data and for generating iteratively generating intermediate values during hashing of data are well known, and reference is made to the Secure Hash Algorithm (SHA) and Message-Digest algorithms 5 (MD5).

The hashing module 130 may store the randomized hash value in a local memory for later reuse and/or it may communicate the randomized hash value to another device through, for example, a communication module 140. The communication module 140 may, for example, enable the hashing module 130 to communicate the randomized hash value to a client computer, a network security server, and/or to another type of data processing system.

Figure 4:
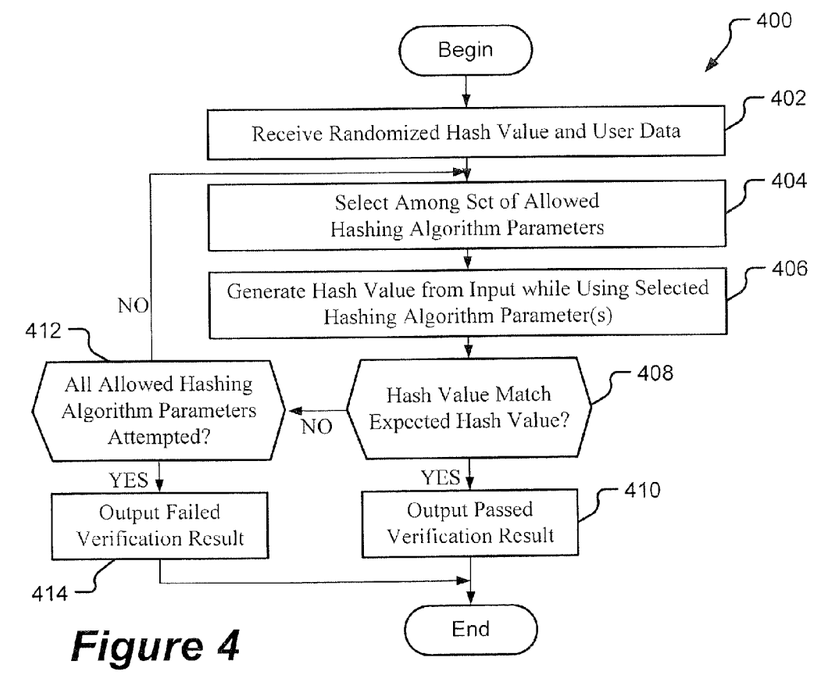
FIG. 4 is a flowchart that illustrates operations, which may be carried out by the verification controller of FIG. 2, to verify data against a randomized hash value in accordance with some embodiments.

FIG. 2 is a block diagram that illustrates a hashing verification controller circuit ("verification controller") 200 that carries out iterative attempts to verify data against a randomized hash value in accordance with some embodiments. FIG. 4 is a flowchart that illustrates operations 400, which may be carried out by the verification controller 200 of FIG. 2, to verify data against an expected randomized hash value in accordance with some embodiments.

Referring to FIGS. 2 and 4, the verification controller 200 includes a hashing parameter selector 210, a repository 220, a hashing module 230, and a verification module 240. The repository 220 (e.g., a computer readable memory) contains a set of different hashing algorithm parameters (e.g., parameter(s)_, parameter(s)_1, . . . parameter(s)_N), which includes at least one of the hashing algorithm parameters and may include all of the parameters that could have been used by the randomized hashing controller 100 from its repository 120. The hashing parameter selector 210 responds to data (block 402) by selecting (block 404) a hashing algorithm parameter (s) among the set of hashing algorithm parameters in the repository 220. The data may be received by a communication module 250 from another device (e.g. client computer, a network security server, and/or another type of data processing system).

The hashing module 230 may generate or otherwise obtain an optional salt value from a memory, and combine the salt value with the data to generate a combined data input. The hashing module 230 then applies a hashing algorithm that uses the selected hashing algorithm parameter to hash the combined data input to generate a hash value (block 406).

The hashing module 230 may use the selected hashing algorithm parameter to define a bit shift distance that the hashing algorithm shifts bits of the data during computation of the randomized hash value. Alternatively or additionally, the hashing module 230 may uses the selected hashing algorithm parameter to define at least one constant that is added to intermediate values of the randomized hash value during computational iterations of the hashing algorithm.

The verification module 240 compares the hash value to an expected randomized hash value, which it may also receive via the communication module 250 from the randomized hashing controller 100 of FIG. 1, and/or it may read it from a memory after computation by the randomized hashing controller 100 which may include a common microprocessor. The verification module 240 determines whether the hash value matches (block 408) the expected randomized hash value and, if so, outputs a passed verification result (block 410). In contrast, when the hash value does not match the expected randomized hash value, the verification module 240 further determines (block 412) whether all allowed hashing algorithm parameters in the repository 220 have been attempted. If not, the verification module 240 selects (block 404) a different remaining one of the hashing algorithm parameters in the repository 220 and repeats the operations of generating another hash value (block 406) and comparing (block 408) that hash value to the expected randomized hash value. In contrast, if all allowed hashing algorithm parameters of the repository 220 have been attempted, the verification module 240 outputs a failed verification result (block 414).

The passed verification result and/or the failed verification result may be stored in a memory for use by another component and/or it may be communicated through the communication module 250 to another device.

Figure 5:
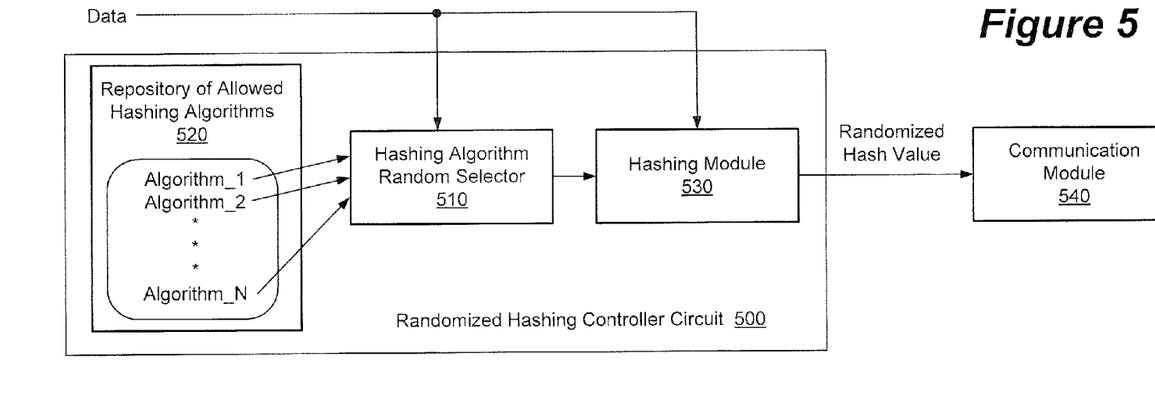
FIG. 5 is a block diagram that illustrates a randomized hashing controller that generates a randomized hash value in accordance with some embodiments.
Figure 7:
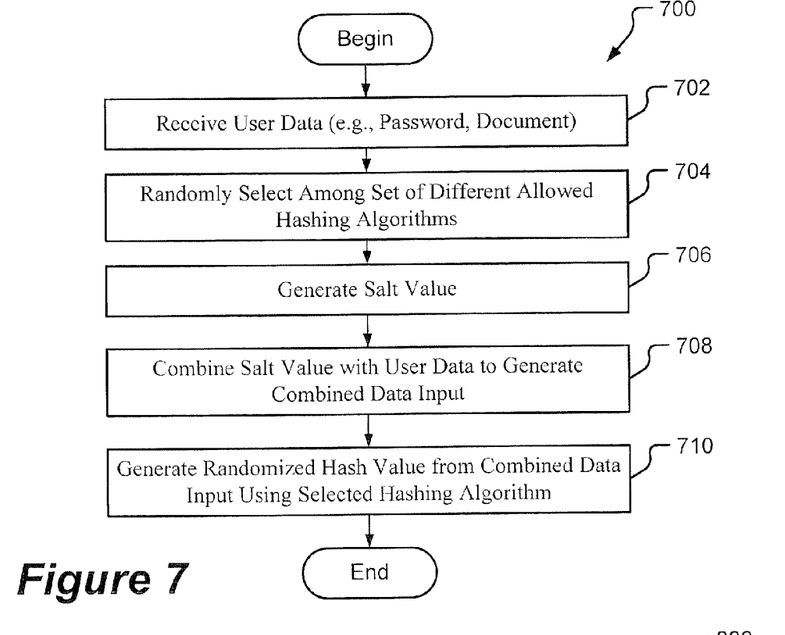
FIG. 7 is a flowchart that illustrates operations, which may be carried out by the randomized hashing controller of FIG. 5, to generate a randomized hash value in accordance with some embodiments.

FIG. 5 is a block diagram that illustrates a randomized hashing controller circuit 500 that generates a randomized hash value in accordance with some other embodiments. FIG. 7 is a block diagram that illustrates operations 700 that may be carried out by the randomized hashing controller circuit 500 of FIG. 5 to generate a randomized hash value in response to receiving data.

Referring to FIGS. 5 and 7, the randomized hashing controller 500 may include a hashing parameter random selector 510, a repository 520, and a hashing module 530. The repository 520 (e.g., a computer readable memory) contains a set of different hashing algorithms (e.g., algorithm_1, algorithm_1, ... algorithm_N). The algorithms may include, but are not limited to, Secure Hash Algorithm (SHA) and Message-Digest algorithms 5 (MD5). The hashing parameter random selector 510 responds to the data (block 702) by randomly selecting (block 704) a hashing algorithm among the set of hashing algorithms in the repository 520.

The hashing module 530 may generate or otherwise obtain an optional salt value (block 706) from a memory, and combine the salt value with the data to generate a combined data input (block 708). The hashing module 530 then applies the selected hashing algorithm to hash the combined data input to generate a randomized hash value (block 710). The hashing module 530 may store the randomized hash value in a local memory for later reuse, and/or it may communicate the randomized hash value to another device through, for example, a communication module 540. The communication module 540 may, for example, enable the hashing module 530 to communicate the randomized hash value to a client computer, a network security server, and/or to another type of data processing system.

Figure 6:
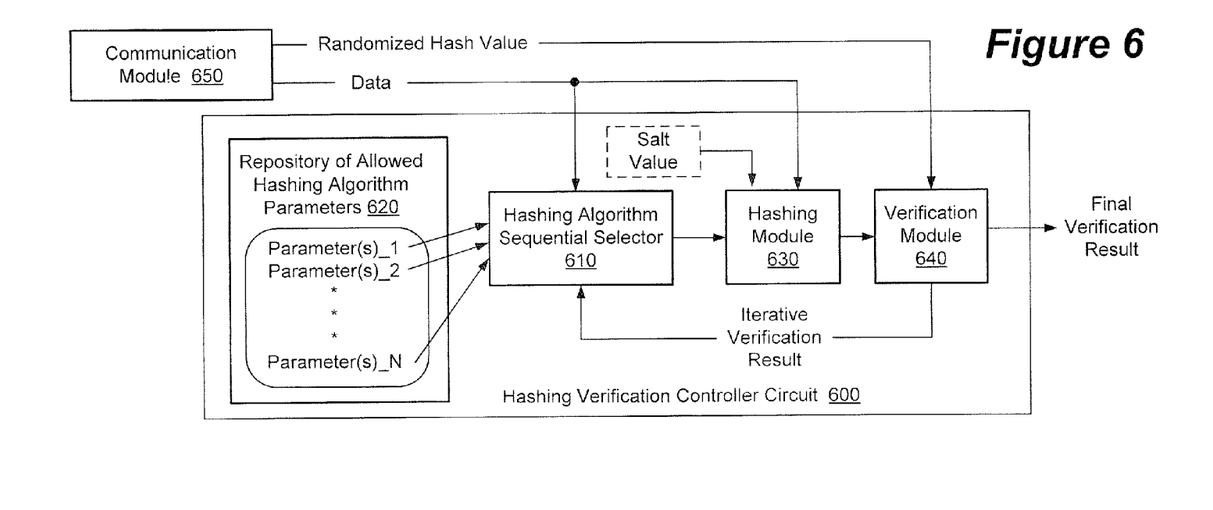
FIG. 6 is a block diagram that illustrates a verification controller that verifies data against a randomized hash value in accordance with some embodiments.
Figure 8:
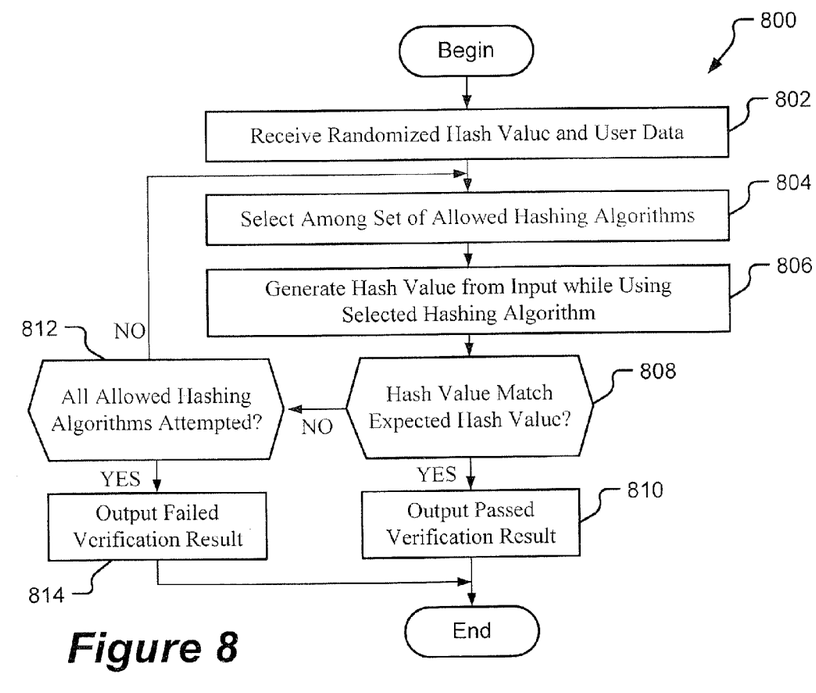
FIG. 8 is a flowchart that illustrates operations, which may be carried out by the iterative attempt verification controller of FIG. 6, to verify data against a randomized hash value in accordance with some embodiments.

FIG. 6 is a block diagram that illustrates a verification controller circuit 600 that carries out iterative attempts to verify data against a randomized hash value in accordance with some embodiments. FIG. 8 is a flowchart that illustrates operations 800, which may be carried out by the verification controller 600 of FIG. 6, to verify data against an expected randomized hash value in accordance with some embodiments.

Referring to FIGS. 6 and 8, the verification controller 600 includes a hashing algorithm selector 610, a repository 620, a hashing module 630, and a verification module 640. The repository 620 (e.g. a computer readable memory) contains a set of different hashing algorithms (e.g. algorithm_1, algorithm_1 algorithm_N), which includes at least one of the hashing algorithms, and may include all of the algorithms that could have been used by the randomized hashing controller 500 from its repository 520. The hashing algorithm selector 610 responds to data (block 802) by selecting (block 804) a hashing algorithm among the set of hashing algorithms in the repository 620. The data may be received by a communication module 650 from another device (e.g. client computer, a network security server, and/or another type of data processing system).

The hashing module 630 may generate or otherwise obtain an optional salt value from a memory, and combine the salt value with the data to generate a combined data input. The hashing module 630 then applies the selected hashing algorithm to hash the combined data input to generate a hash value (block 806).

The verification module 640 compares the hash value to an expected randomized hash value, which its may also receive via the communication module 650 from another device and/or it may read it from a memory. The verification module 640 determines whether the hash value matches (block 808) the expected randomized hash value and, if so, it outputs a passed verification result (block 810). In contrast, when the hash value does not match the expected randomized hash value, the verification module 640 further determines (block 812) whether all allowed hashing algorithm parameters in the repository 620 have been attempted. If not, the verification module 640 selects (block 804) a different remaining one of the hashing algorithm parameters in the repository 620 and repeats the operations of generating another hash value (block 806) and comparing (block 808) that hash value to the expected randomized hash value. In contrast, if all allowed hashing algorithm parameters of the repository 620 have been attempted, the verification module 640 outputs a failed verification result (block 814).

The passed verification result and/or the failed verification result may be stored in a memory for use by another component and/or it may be communicated through the communication module 650 to another device.

Figure 9:
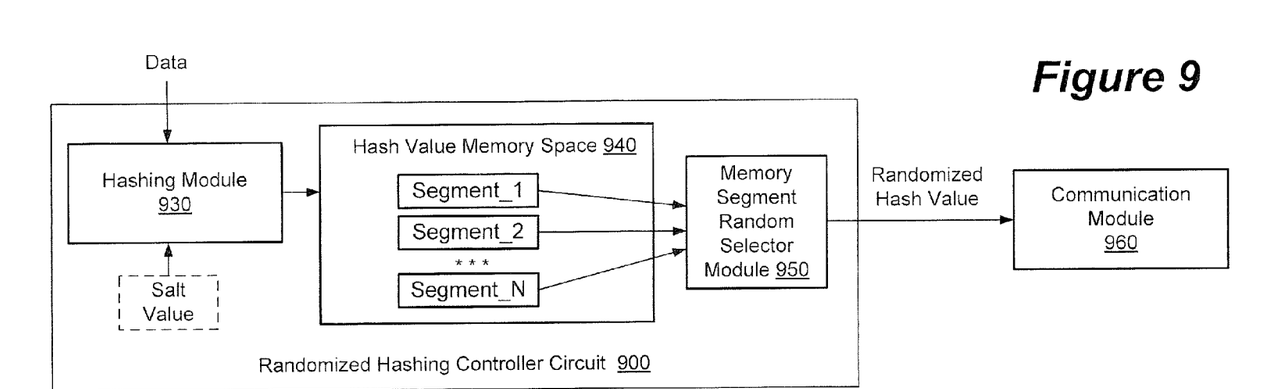
FIG. 9 is a block diagram that illustrates a randomized hashing controller that generates a randomized hash value in accordance with some embodiments.

FIG. 9 is a block diagram that illustrates a randomized hashing controller circuit 900 that generates a randomized hash value in accordance with some other embodiments. FIG.

Figure 11:
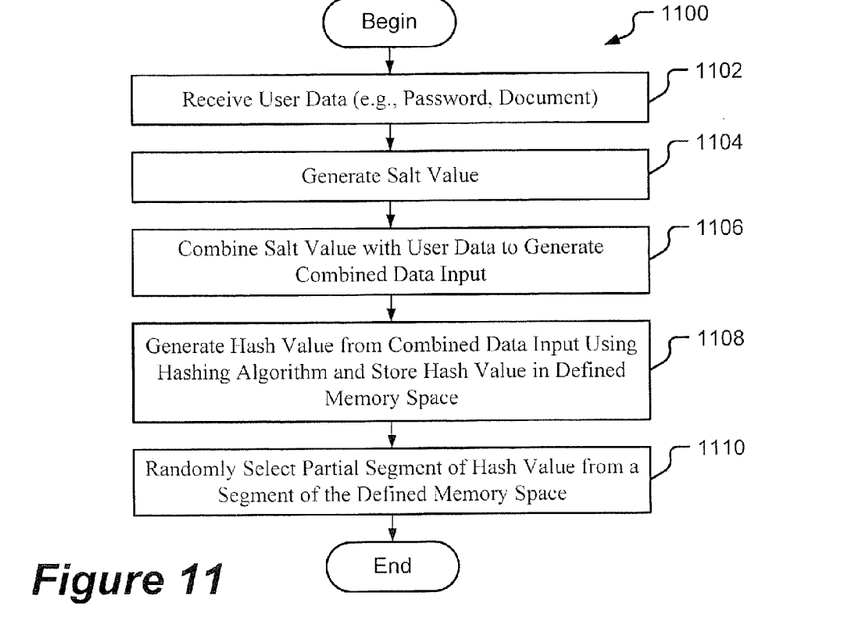
FIG. 11 is a flowchart that illustrates operations, which may be carried out by the randomized hashing controller of FIG. 9, to generate a randomized hash value in accordance with some embodiments.

11 is a block diagram that illustrates operations 1100 that may be carried out by the randomized hashing controller 900 of FIG. 9 to generate a randomized hash value in response to receiving data.

Referring to FIGS. 9 and 11, the randomized hashing controller 900 may include a hashing module 930, a hashing value memory space (e.g. read/write addressable locations with a RAM for storing a hash value) 940, and a memory segment random selector module 950.

The hashing module 930 responds to data (block 1102) by optionally generating or otherwise obtaining a salt value (block 1104) from a memory, and combines the salt value with the data to generate a combined data input (block 1106). The hashing module 930 applies a hashing algorithm to hash the combined data input to generate a hash value (block 1108). The hashing module 930 stores the hash value across a plurality of defined segments (e.g., segment_1, segment_2, . . . segment_N) which may correspond to separately addressable read/write memory locations in the hash value memory space 940.

The memory segment random selector module 950 is configured to randomly select (block 1110) a partial segment of the hash value from a segment of the memory space 940 to generate a randomized hash value. For example, the hashing module 930 may store the hash value across two segments (e.g., segment_1 occupying 256 bits and segment_2 occupying another 256 bits) of the memory space 940, and the selector module 950 may randomly select either the first half (e.g., segment_1) or a second half (e.g., segment_2) of the memory space 940 containing the hash value to generate the randomized hash value.

The selector module 950 may store the randomized hash value in a local memory for later reuse, and/or it may communicate the randomized hash value to another device through, for example, a communication module 960. The communication module 930 may, for example, enable the selector module 950 to communicate the randomized hash value to a client computer, a network security server, and/or to another type of data processing system.

Figure 10:
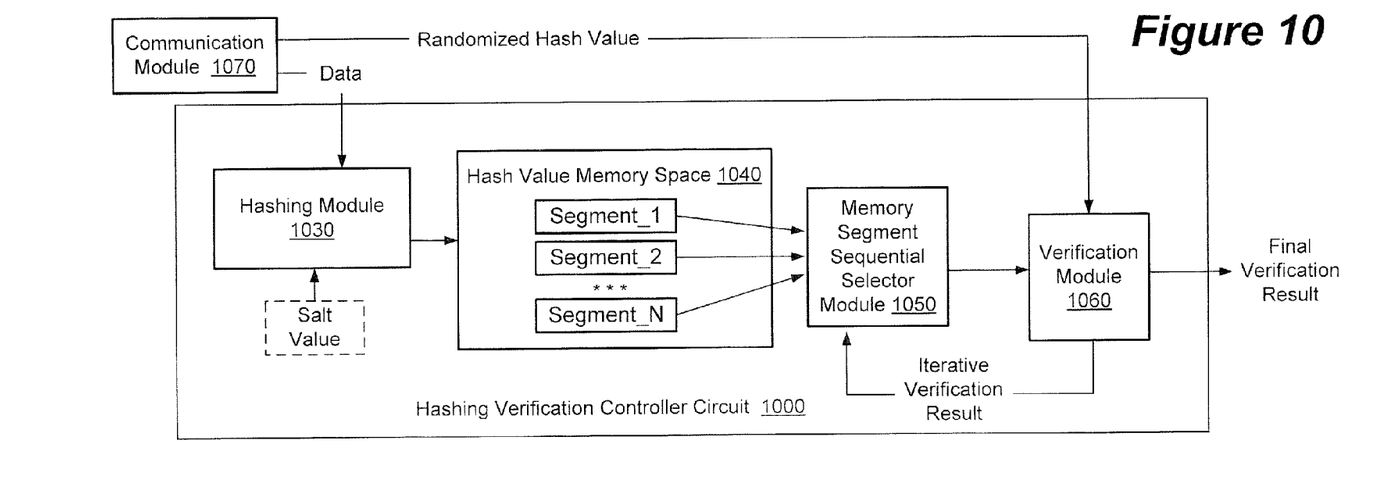
FIG. 10 is a block diagram that illustrates a verification controller that verifies data against a randomized hash value in accordance with some embodiments.
Figure 12:
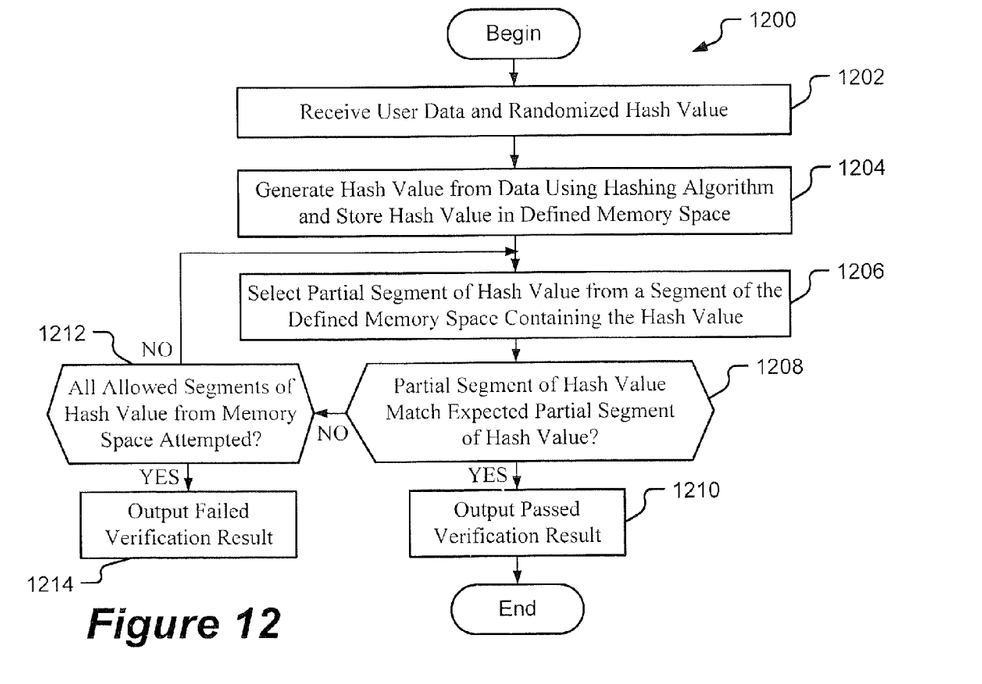
FIG. 12 is a flowchart that illustrates operations, which may be carried out by the iterative attempt verification controller of FIG. 10, to verify data against a randomized hash value in accordance with some embodiments.

FIG. 10 is a block diagram that illustrates a verification controller circuit 1000 that carries out iterative attempts to verify data against a known randomized hash value in accordance with some embodiments. FIG. 12 is a flowchart that illustrates operations 1200, which may be carried out by the verification controller 1000 of FIG. 10, to verify data against an expected randomized hash value in accordance with some embodiments.

Referring to FIGS. 10 and 12, the verification controller 1000 may include a hashing module 1030, a hashing value memory space (e.g. read/write addressable locations with a RAM for storing a hash value) 1040, a memory segment selector module 1050, and a verification module 1060.

The hashing module 1030 responds to received data (block 1202) by optionally generating or otherwise obtaining a salt value from a memory, and combining the salt value with the data to generate a combined data input. The data may be received by a communication module 1070 from another device (e.g. client computer, a network security server, and/or another type of data processing system).

The hashing module 1030 applies a hashing algorithm to hash the combined data input to generate a hash value (block 1204). The hashing module 1030 stores the hash value across a plurality of defined segments (e.g., segment_1, segment_2, . . . segment_N) which may correspond to separately addressable read/write memory locations in the hash value memory space 1040.

The memory segment selector module 1050 is configured to select (block 1206) a partial segment of the hash value from a segment of the memory space 1040 to generate a randomized hash value. For example, the hashing module 1030 may store the hash value across two segments (e.g., segment_1 occupying 256 bits and segment_2 occupying another 256 bits) of the memory space 1040, and the selector module 1050 may randomly select either the first half (e.g. segment_1) or a second half (e.g., segment_2) of the memory space 1040 containing the hash value to generate a hash value.

The verification module 1060 compares the hash value to an expected randomized hash value, which its may also receive via the communication module 1070 from another device and/or it may read it from a memory. The verification module 1060 determines whether the hash value matches (block 1208) the expected randomized hash value and, if so, outputs a passed verification result (block 1210).

In contrast, when the hash value does not match the expected randomized hash value, the verification module 1060 further determines (block 1212) whether all partial segments of the hash value in the memory space 1040 have been attempted. If not, the verification module 1060 selects (block 1206) a different remaining one of the hashing algorithm parameters in the memory space 1040 and repeats the operations of generating another hash value (block 806) and comparing (block 1208) that hash value to the expected randomized hash value. In contrast, if all of the partial segments of the hash value in the memory space 1040 have been attempted, the verification module 1060 outputs a failed verification result (block 1214).

The passed verification result and/or the failed verification result may be stored in a memory for use by another component and/or it may be communicated through the communication module 1070 to another device.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A system comprising:
a randomized hashing controller circuit that generates a randomized hash value and verifies a randomized hash value;
wherein the hashing controller circuit responds to receiving data by randomly selecting a hashing algorithm parameter among a defined first set of different hashing algorithm parameters, and by applying a hashing algorithm that uses the selected hashing algorithm parameter to hash the received data to generate the randomized hash value; and
wherein the hashing controller circuit uses the selected hashing algorithm parameter to define at least one constant that is added to intermediate values of the randomized hash value during computational iterations of the hashing algorithm; and
a hashing verification circuit that is to respond to receiving data that is to be verified against the randomized hash value by selecting among a defined second set of different hashing algorithm parameters that include at least one of the hashing algorithm parameters used by the randomized hashing controller from the first set, applying a hashing algorithm that uses the selected hashing algorithm parameter to hash the data to generate a hash value, comparing the hash value to the randomized hash value, outputting a passed verification result in response to the hash value matching the randomized hash value, and repeating the selecting, applying, and comparing operations in response to the hash value not matching that the randomized hash value.

2. The system of claim 1, wherein:
the hashing controller circuit uses the selected hashing algorithm parameter to define a bit shift distance that the hashing algorithm bit shifts the received data during computation of the randomized hash value.

3. The system of claim 1, wherein:
the hashing verification circuit is to output a failed verification result in response to not finding a match between the generated hash values and the randomized hash value after attempting the selecting, applying, and comparing operations using each of the different hashing algorithm parameters in the defined set.

4. The system of claim 1, wherein:
the hashing verification circuit uses the selected hashing algorithm parameter to define a bit shift distance that the hashing algorithm bit shifts the data during computation of the hash value.

5. The system of claim 1, wherein:
the controller comprises a hashing controller circuit that is configured to respond to receiving data by randomly selecting a hashing algorithm among a defined set of different hashing algorithms, and by applying the selected hashing algorithm to hash the received data to generate the randomized hash value.

6. The system of claim 5, wherein:
the hashing controller circuit selects the hashing algorithm among a set that includes hashing algorithms based on at least Secure Hash Algorithm (SHA) and Message-Digest algorithms 5 (MD5).

7. The system of claim 1, wherein:
the controller comprises a hashing verification circuit that is to respond to data that is to be verified against the randomized hash value by selecting among a defined set of different hashing algorithms, applying the selected hashing algorithm to hash the data to generate a hash value, comparing the hash value to the randomized hash value, outputting a passed verification result in response to the hash value matching the randomized hash value, and repeating the selecting, applying, and comparing operations in response to the hash value not matching that the randomized hash value.

8. The system of claim 7, wherein:
the hashing verification circuit is to output a failed verification result in response to not finding a match between the generated hash values and the randomized hash value after attempting the selecting, applying, and comparing operations using each of the different hashing algorithms in the defined set.

9. The system of claim 8, wherein:
the hashing verification circuit selects the hashing algorithm among a set that includes hashing algorithms based on at least Secure Hash Algorithm (SHA) and Message-Digest algorithms 5 (MD5).

10. The system of claim 1, wherein:
the hashing controller circuit is to randomly select either a first half or a second half of the memory space containing the hash value to generate the randomized hash value.

11. The system of claim 1, wherein:
the controller comprises a hashing verification circuit that is to respond to data that is to be verified against the randomized hash value by applying a hashing algorithm to hash the data to generate a hash value that occupies a memory space, selecting a partial segment of the hash value from a segment of the memory space to generate a hash value, comparing the hash value to the randomized hash value, outputting a passed verification result in response to the hash value matching the randomized hash value, and repeating the selecting and comparing operations in response to the hash value not matching that the randomized hash value.

12. The system of claim 11, wherein:
the hashing verification circuit is to output a failed verification result in response to not finding a match between any selected segment of the memory space and the randomized hash value.

13. The system of claim 1, wherein the hashing controller circuit responds to receiving data by applying a hashing algorithm that uses the selected hashing algorithm parameter to hash the received data to generate an intermediate hash value that is stored in a memory space, and by randomly selecting a partial segment of the hash value from a segment of the memory space to generate the randomized hash value.

* * * * *

UNITED STATES PATENT AND TRADEMARK OFFICE
CERTIFICATE OF CORRECTION

| | | |
|---|---|---|
| PATENT NO. | : 8,649,509 B2 | Page 1 of 1 |
| APPLICATION NO. | : 12/338407 | |
| DATED | : February 11, 2014 | |
| INVENTOR(S) | : Asher | |

It is certified that error appears in the above-identified patent and that said Letters Patent is hereby corrected as shown below:

<u>In the Claims:</u>
Column 10, Claim 1, Line 52: Please correct "hash value; and"
                                      to read -- hash value; --

Column 11, Claim 5, Lines 23-24: Please correct "that is configured to respond"
                                        to read -- that is to respond --

Signed and Sealed this
Fifteenth Day of July, 2014

Michelle K. Lee
*Deputy Director of the United States Patent and Trademark Office*